Patented Feb. 20, 1951

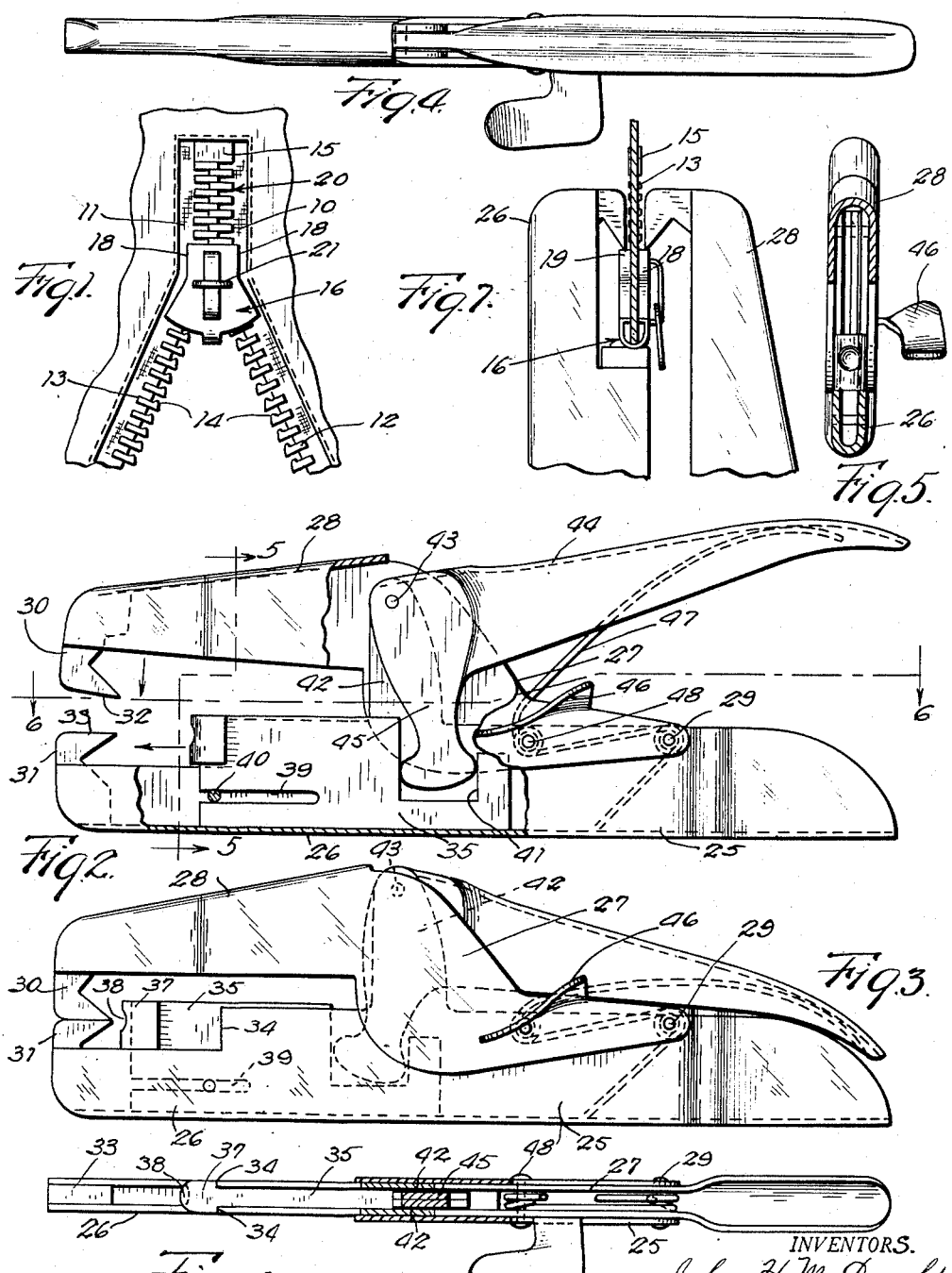

2,542,201

UNITED STATES PATENT OFFICE 2,542,201

TOOL FOR REMOVING THE SLIDE FROM A SLIDE FASTENER

John H. McDonald and John J. Evans, Chicago, Ill., assignors, by mesne assignments, to Glenbard Tool Mfrs., Inc., Chicago, Ill., a corporation of Illinois Application June 11, 1948, Serial No. 32,475

6 Claims. (Cl. 81—15)

The present invention relates to a slide fastener tool and has special reference to a tool for removing a slide from its fastener.

More particularly, this invention pertains to a slide removing tool which may be employed to quickly and easily remove a slide from its fastener without injury of any kind to either the slide or the fastener.

Slide fasteners, often referred to as "zippers," are very widely used, being employed for the same purposes as most other types of fasteners. However, slide fasteners are subject to jamming and injury. A piece of fabric may become wedged between the slide and its fastener, or the slide may become distorted or misshapen, preventing its normal operation or resulting in unintended removal from its fastener. These and many other difficulties may occur to slide fasteners, all of which may make it necessary to remove the slide from its cooperating fastener.

Heretofore it has been common practice to use a pointed tool, such as an icepick, for forcing the free ends of the fastener apart so that the slide could be removed. This was not only laborious and tedious, but frequently resulted in deformation of the slide, rendering it unfit for re-use or at least unsatisfactory in operation when replaced on the fastener. If the top and bottom portions of the slide are too close together, binding occurs between the slide and the fastener; and if these portions are too far apart, the slide may accidentally become separated from the fastener. It is essential for the proper operation of the slide that the opposed portions of the top and bottom be evenly spaced and the required distance apart. Any distortion or bending of the slide will therefore prevent its proper operation. The use of such tools also occasionally resulted in injury to the fastener or the teeth forming a part thereof.

With applicant's device, the free end of the slide are moved gradually over wedge members which force these ends evenly and without distortion away from each other and the fastener. This is accomplished in a minimum of time, as it is merely necessary to place the tool over the slide, actuate the handles, then lift the slide from its fastener. Moreover, the tool may be operated with one hand, leaving the other hand free for any desired use.

An object of the present invention is to provide a tool for removing a slide from its fastener.

Another object is to provide such a tool which may be employed to easily and quickly remove a slide without injury to either the slide or slide fastener.

A further object is to provide a tool of this character which is normally maintained in position for operation and may be operated with one hand.

Further objects and advantages will be apparent from the following description and claims when considered with the accompanying drawing, in which—

Fig. 1 is a top plan view of a slide fastener and its cooperating slide;

Fig. 2 is a side elevational view of a slide-removing tool embodying the present invention;

Fig. 3 is a view similar to Fig. 2 with the parts thereof in changed position;

Fig. 4 is a top plan view of the tool illustrated in Fig. 2;

Fig. 5 is a vertical cross-sectional view taken on lines 5—5 of Fig. 2;

Fig. 6 is a cross-sectional view partially in elevation, taken along the lines 6—6 of Fig. 2; and Fig. 7 is a partial side elevational view of the tool jaws and various associated parts of the tool in initial slide-removing position.

Referring more particularly to the drawings, there is disclosed one form of slide-removing tool embodying the present invention which may be employed for removing the slide from a slide fastener or zipper.

The slide fastener to be operated upon by the tool is shown in Figs. 1 and 7 and comprises side tapes 10 and 11 having inwardly projecting teeth 12 and 13 fastened thereto, the teeth on each of the tapes being slightly spaced apart. A projection 14 is formed on one side of each tooth, and the opposite side thereof is provided with an indentation for receiving the projection 14 of the next adjacent tooth when the zipper or fastener is in closed position. The ends of the tape and teeth are secured together by a backstop 15 which maintains the tapes together at one end and the adjacent teeth meshed in closed position.

Mounted on the fastener is a slide 16, substantially U-shaped in elevation, as shown in Fig. 7, with inwardly extending side flanges 18 and 19 on each side thereof. Thus the top and bottom portions adjacent the free ends are substantially U-shaped in cross section. The width of the channel portions of the slide is such as to force the teeth 13 and 14 together in intermeshing relation, as shown at 20, when the zipper is moved away from the backstop to close the fastener. Pivotally mounted on the top side of the slide 16 is a handle 21 to facilitate manipulation of the slide toward and away from the backstop 15. In use, the tapes are sewed or otherwise secured to the sides of the opening to be closed.

In order to remove the slide from the remainder of the fastener, the opposite free ends of the slide must be separated a sufficient distance to permit the flanges 18 and 19 to pass over the teeth 12 and 13. The slide-removing tool illustrated comprises a handle member 25 having a jaw portion 26 at the end thereof. An arm 27 having a jaw portion 28 is pivotally connected to the handle member 25 by a pivot 29. For this purpose the arm 27 is preferably bifurcated so as to fit over the outer surfaces of the handle member 25. Both jaw portions 26 and 28 are preferably channel shaped, with the open sides facing each other, and if desired, the entire handle portion 25 may also be channel-shaped, as shown particularly in Figs. 5 and 6.

Wedge members 30 and 31 are secured to the jaw portions 28 and 26, respectively, with the wedge portions extending toward each other. The opposed faces 32 and 33 of the wedge members 30 and 31 are preferably flat and arranged so that when they are brought together there will be substantially a surface contact. However, it may sometimes be desirable to have the inner knife edge portions thereof, which will now be described, somewhat closer together than the rest of the surfaces 32 and 33.

The wedge members 30 and 31 are provided with wedge portions spaced somewhat from their respective jaw portions 28, 26 and extending inwardly toward the handle 25 and arm 27. These portions taper inwardly to the opposed faces 32 and 33 forming a relatively-sharp, substantially knife-edge at the intersection therewith. The edge is sharp enough to permit its insertion between the fastener and slide. With this construction, when the two wedge members 30 and 31 are together, as shown in Fig. 3, the sloping sides thereof in effect correspond to the equal sides of an isosceles triangle. However, it is not essential that the sloping of these members be identical, and, if desired, the tapering edges may be curved. The spacing of the wedge portions from the jaw portions provides shanks on the wedge members which serve as abutments to limit the forward movement of the slide when operated on as subsequently described.

The lower jaw portion 26 is preferably of reduced thickness at a distance from the outer end forming shoulders 34. A pusher member 35 is slidably mounted between the sides of the lower jaw portion 26 for reciprocal movement therein. The pusher member 35 fits between the inner surfaces of the sides of the jaw portion 26, and at the outer end thereof is provided with an enlarged head portion 37 which abuts the shoulders 34, thereby limiting inward movement of the pusher member. A recess or indentation 38 is formed in the forward face of the head 37 for fitting the curved rear end of the slide. A rearwardly extending slot 39 is formed in the forward face of the pusher member 35, and a pin 40 extending between the sides of the jaw portion 26 rides in the slot 39 and prevents removal of the pusher 35. Adjacent the rear of the pusher member 35 there is an upwardly-facing recess 41.

Extending upwardly from opposite sides of the handle 25 is a pair of opposed bearing portions 42 between which extends a pivot 43. Mounted about the pivot 43 is a bell-crank lever comprising a handle portion 44 and a downwardly extending arm 45 having a rounded end portion which fits into the recess 41 in the pusher member 35. Consequently, when the handle portion 44 is forced downwardly, the pusher 35 is moved forwardly toward the knife edges of the wedge members 30 and 31. Any other suitable arrangement may be employed to accomplish this result. To facilitate moving the jaws 26 and 28 toward each other, a thumb rest 46 may be secured to the arm 27. The thumb rest is so positioned that when the handles 44 and 25 are grasped in the right hand of the operator, the thumb of this hand may engage the thumb rest. By pushing downwardly on the thumb rest, the jaw portions 26 and 28 and their respective wedge members 30 and 31 are moved toward each other, and movement of the handle portion 44 toward the handle portion 25 serves to force the pusher member 35 forwardly in the direction of the wedge members.

A spring 47 may be arranged as shown in Figs. 2 and 3 with one end engaging the inner face of the bottom portion of the handle 25, then passing over the pivot 29 and under a pin 48 extending between the sides of the arms 27, and then up against the lower inner face of the handle portion 44. As thus arranged, the spring 47 tends to maintain the handle 44 away from the handle 25, and the arm 27 in its upper position. Obviously, other spring means may be employed to accomplish this result.

To remove a slide from its fastener, the tool is inserted over the slide 16 from the rear toward the free edges thereof, with the wedge portions 30 and 31 in front of the free ends of the slide. The thumb rest 46 is then moved downwardly by the pressure of the thumb to bring the wedge members 30 and 31 adjacent the front central portions of the slide with the opposed faces 32 and 33 contacting the top and bottom of the fastener, as illustrated in Fig. 7. It is to be noted that the head 37 of the pusher 35 is to the rear of the closed end of the slide. Thereafter, movement of the handle portion 44 toward the handle 25 will force the pusher member 35 toward the wedges 30 and 31, thereby moving the free ends of the slide up the inclined faces of the wedge members 30 and 31 and forcing these ends away from each other a sufficient distance to permit ready removal of the slide from the fastener without any injury to it or its fastener.

While a single preferred embodiment of the present invention has been shown and described, it is obvious that various changes may be made therein within the skill of the art without departing from the present invention. Therefore we wish to be limited only by the prior art and the appended claims.

We claim:

1. A tool of the class described, comprising a pair of operatively interconnected jaw members movable toward and from each other having inwardly directed semiwedges at their end portions adapted in closed position of said members to define a wedge, a pusher bar movably carried by one member, guide means on said member for restricting said bar to linear movement toward and away from said wedge, a lever member operatively connected to the bar, means for closing the jaw members, and means for operating said lever member to actuate said pusher bar toward said wedge.

2. A tool for spreading apart the slide of a slide fastener, comprising a pair of jaw members operatively interconnected for movement toward and from each other formed respectively with inwardly facing semiwedges at their free end portions adapted in closed position of said members to define a wedge, means movably mounted on one of the members and guided thereby for linear movement toward said wedge to push a slide thereagainst, operating means for closing said jaw members and urging said first-mentioned means toward the wedge, said operating means being adapted to fit within one hand of an operator, and an abutment surface on at least one semiwedge engageable with the slide to limit spreading thereof by said wedge under the action of the first-mentioned means.

3. A tool of the class described, comprising a pair of operatively interconnected jaw members movable toward and from each other having inwardly directed semiwedges at their end portions adapted in closed position of said members to define a wedge, a pusher movably carried by one member, guide means on said member for restricting said pusher to linear movement toward and away from the wedge end of said member, means for closing the jaw members, and means operatively associated with said pusher for actuating the same toward said wedge end of said one member.

4. A tool of the class described comprising a pair of operatively interconnected jaw members movable toward and away from each other having inwardly directed tapered elements at their end portions shaped to define an inwardly-pointing wedge when in closed position adjacent each other, a pusher associated with a least one of said members mounted for reciprocal movement toward and away from the wedge end of said member, means for closing the jaw members, and means operatively associated with said pusher for actuating the same toward said wedge end of said member.

5. A tool of the class described comprising a pair of operatively interconnected jaw members movable toward and from each other having inwardly-directed tapered elements shaped to define an inwardly-pointing wedge when in closed position adjacent each other, a pusher movably associated with one of said members, guide means on said member for restricting said pusher to movement generally longitudinally of said member toward and away from the wedge end of said member, means for closing the jaw members, and means operatively associated with said pusher for actuating the same toward the wedge end of said one member.

6. A tool of the class described comprising a pair of operatively interconnected jaw members movable toward and from each other having inwardly-directed tapered elements shaped to define an inwardly-pointing wedge when in closed position adjacent each other, a pusher movably associated with one of said members, guide means on said member for restricting said pusher to movement generally longitudinally of said member toward and away from the wedge end of said member, means for closing the jaw members, means operatively associated with said pusher for actuating the same toward the wedge end of said one member, and resilient means for normally maintaining said jaw members in open position and said pusher in retracted position away from the wedge end of said member.

JOHN H. McDONALD.
JOHN J. EVANS.

REFERENCES CITED

The following references are of record in the file of this patent:

UNITED STATES PATENTS

| Number | Name | Date |
| --- | --- | --- |
| 986,133 | Butsch | Mar. 7, 1911 |
| 1,074,058 | Maxwell et al. | Sept. 23, 1914 |
| 1,206,449 | Linquist | Nov. 28, 1916 |
| 1,432,558 | Jackson | Oct. 17, 1922 |
| 1,555,652 | Frame | Sept. 29, 1925 |
| 2,090,872 | Lamb | Aug. 24, 1937 |
| 2,340,995 | Smith | Feb. 8, 1944 |